United States Patent
Wang et al.

(10) Patent No.: US 9,755,739 B1
(45) Date of Patent: Sep. 5, 2017

(54) WFOV AND NFOV SHARED APERTURE BEACON LASER

(71) Applicant: Google Inc., Mountain View, CA (US)

(72) Inventors: Chiachi Wang, Union City, CA (US); Michael Sholl, Pacifica, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/171,348

(22) Filed: Jun. 2, 2016

(51) Int. Cl.
| | |
|---|---|
| G02B 26/00 | (2006.01) |
| G02B 6/42 | (2006.01) |
| G02B 6/26 | (2006.01) |
| G02B 6/28 | (2006.01) |
| H04B 10/11 | (2013.01) |
| H04B 10/2581 | (2013.01) |
| H04B 10/50 | (2013.01) |
| G02B 6/036 | (2006.01) |
| G02B 27/09 | (2006.01) |
| G02B 6/34 | (2006.01) |

(52) U.S. Cl.
CPC ......... *H04B 10/11* (2013.01); *G02B 6/03622* (2013.01); *G02B 6/34* (2013.01); *G02B 27/0927* (2013.01); *H04B 10/2581* (2013.01); *H04B 10/503* (2013.01)

(58) Field of Classification Search
None
See application file for complete search history.

(56) References Cited

U.S. PATENT DOCUMENTS

| | | | | |
|---|---|---|---|---|
| 5,657,153 | A * | 8/1997 | Endriz | H04B 10/291 359/333 |
| 5,761,234 | A * | 6/1998 | Craig | H01S 3/094003 372/33 |
| 5,867,305 | A * | 2/1999 | Waarts | H01S 3/06754 359/337.12 |
| 6,434,295 | B1 * | 8/2002 | MacCormack | H01S 3/067 385/27 |
| 6,477,307 | B1 * | 11/2002 | Tankala | C03B 37/01211 385/127 |
| 6,751,241 | B2 * | 6/2004 | Davis | H01S 3/063 372/43.01 |
| 7,590,324 | B1 * | 9/2009 | Chen | G02B 6/02261 385/123 |

(Continued)

*Primary Examiner* — Oommen Jacob
(74) *Attorney, Agent, or Firm* — Honigman Miller Schwartz and Cohn LLP

(57) ABSTRACT

A method of free-space optical communication includes guiding, by focusing optics, an optical communication beam emitted from an optical transmitter into a double-clad optical fiber. The optical communication beam carrying data. The double-clad optical fiber has first and second ends, where the first end is arranged to receive the optical communication beam. The double-clad optical fiber includes a fiber core, a first cladding, and a second cladding. The method also includes directing, by collimating optics, the optical communication beam from the second end of the double-clad optical fiber toward an optical receiver of a communication terminal. the second portion of the optical communication beam arranged concentrically around the first portion of the optical communication beam, the first portion of the optical communication beam having a higher intensity than the second portion of the optical communication beam.

27 Claims, 13 Drawing Sheets

(56) References Cited

U.S. PATENT DOCUMENTS

| | | | |
|---|---|---|---|
| 7,787,506 B1* | 8/2010 | Jiang | H01S 3/067 372/25 |
| 8,781,269 B2* | 7/2014 | Huber | B23K 26/073 385/147 |
| 2005/0105867 A1* | 5/2005 | Koch, III | G02B 6/02338 385/125 |
| 2007/0213618 A1* | 9/2007 | Li | A61B 1/00096 600/476 |
| 2008/0030847 A1* | 2/2008 | Murison | H01S 3/06754 359/341.3 |
| 2009/0097807 A1 | 4/2009 | Gu et al. | |
| 2010/0021114 A1* | 1/2010 | Chen | G02B 6/02214 385/116 |
| 2011/0007760 A1* | 1/2011 | Clowes | H01S 3/0057 372/6 |
| 2012/0320935 A1* | 12/2012 | Cox | H01S 3/067 372/6 |
| 2013/0148925 A1* | 6/2013 | Muendel | G02B 6/32 385/27 |
| 2013/0235449 A1* | 9/2013 | Suzuki | H01S 3/0405 359/341.1 |
| 2014/0064305 A1* | 3/2014 | Sipes, Jr. | G02B 19/0057 372/6 |
| 2014/0168631 A1* | 6/2014 | Haslim | G01S 17/06 356/4.01 |
| 2016/0170117 A1* | 6/2016 | Yeh | G02B 5/3083 359/352 |
| 2016/0202419 A1* | 7/2016 | Lapointe | G02B 6/2852 385/29 |

* cited by examiner

WFOV AND NFOV SHARED APERTURE BEACON LASER

TECHNICAL FIELD

This disclosure relates to low cost compact wide-field-of-view (WFOV) and narrow-field-of-view (NFOV) shared aperture beacon laser beams.

BACKGROUND

Communication terminals may transmit and receive optical signals through free space optical links. Communicating terminals generally use acquisition and tracking systems to establish the optical link by pointing optical beams toward one another. For instance, a transmitting terminal may use a beacon laser to illuminate a receiving terminal, while the receiving terminal may use a position sensor to locate the transmitting terminal to monitor the beacon laser. Additionally, steering mechanisms may maneuver the terminals to point toward each other and to track the pointing once acquisition is established. For communication terminals that move relative to one another at high speeds, such as satellites or high altitude communication devices, a fast steering mirror or a fast gimbal is generally used as the steering mechanism. Such acquisition and tracking systems used to connect moving communication terminals are costly due to the high level of sophistication required for moving terminals. Communication terminals installed on buildings, however, are relatively stable, and may therefore establish the optical link using a simpler acquisition and tracking functionality than those associated with communication terminals that move relative to one another.

SUMMARY

One aspect of the disclosure provides a method of free-space optical communication. The method includes guiding, by focusing optics, an optical communication beam emitted from an optical transmitter into a double-clad optical fiber and directing, by collimating optics, the optical communication beam from the second end of the double-clad optical fiber toward an optical receiver of a communication terminal. The optical communication beam carries data. The double-clad optical fiber has first and second ends, and the first end is arranged to receive the optical communication beam. The double-clad optical fiber includes a fiber core having a first numerical aperture, a first cladding arranged concentrically around the fiber core, and a second cladding arranged concentrically around the first cladding. The fiber core is configured to propagate a first portion of the optical communication beam from the first end of the double-clad optical fiber to the second end of the double-clad optical fiber. The first cladding has a second numerical aperture equal to or greater than the first numerical aperture. Moreover, the first cladding is configured to propagate a second portion of the optical communication beam from the first end of the double-clad optical fiber to the second end of the double-clad optical fiber. The second portion of the optical communication beam is arranged concentrically around the first portion of the optical communication beam, the first portion of the optical communication beam having a higher intensity than the second portion of the optical communication beam.

Implementations of the disclosure may include one or more of the following optional features. In some implementations, the focusing optics are configured to direct the first portion of the optical communication beam from the optical transmitter into the fiber core of the double-clad optical fiber and direct the second portion of the optical communication beam from the optical transmitter into the first cladding of the double-clad optical fiber. The method may also include perturbing the fiber core to couple the second portion of the optical communication beam from the fiber core to propagate in the first grating as a low intensity portion of the optical communication beam. The first portion of the optical communication beam propagates in the fiber core as a high intensity portion of the optical communication beam. The perturbation of the fiber core may include exerting a diametric force on the double-clad optical fiber to cause a microbending loss of the fiber core. The microbending loss of the fiber core results in the coupling of the second portion of the optical communication beam from the fiber core to propagate in the first grating as the low intensity portion of the optical communication beam. A coupling ratio of the second portion of the optical communication beam to the first portion of the optical communication beam depends on a strength of the diametric force and at least one period of at least one corresponding groove formed in the double-clad optical fiber due to the diametric force. The perturbation of the fiber core may cause a speckle free, flat top type of output power profile of the optical communication beam as the optical communication may exit the double-clad optical fiber. The optical transmitter may include a single-mode light source.

In some examples, the method includes coupling, by a long period grating, the second portion of the optical communication beam from the fiber core to propagate in the first grating as a low intensity portion of the optical communication beam. The first portion of the optical communication beam may propagate in the fiber core as a high intensity portion of the optical communication beam. A coupling ratio of the second portion of the optical communication beam to the first portion of the optical communication beam may be such that the second portion of the optical communication beam has a lower intensity than the first portion of the optical communication beam at a threshold distance from the collimating optics. In some examples, the method includes receiving, at positioning hardware, a position error from the communication terminal. The position error is indicative of a misalignment between the collimating optics and the optical receiver of the communication terminal. The method also includes adjusting, by the positioning hardware, an alignment of the collimating optics with the optical receiver of the communication terminal based on the position error. The first portion of the optical communication beam may have a narrower field of view and a higher optical signal-to-noise ratio than the second portion of the collimated optical communication beam.

The collimating optics may include at least one of a lens, a shaped fiber tip at the first end of the double-clad optical fiber, or a graded index fiber. The optical transmitter may include a laser diode, a light emitting diode, a fiber laser, or a solid state laser. The optical transmitter may modulate the optical communication beam to encode the data in the optical communication beam. The fiber core may include a single mode core or a multimode core.

In some examples, the optical transmitter is coupled to a double-clad optical fiber having first and second ends. The double-clad optical fiber includes a fiber core, a first cladding, and a second cladding. The fiber core has a first numerical aperture and is configured to output a high intensity light portion. The first cladding is arranged concentrically around the fiber core and has a second numerical aperture equal to or greater than the first numerical aperture. Moreover, the first cladding is configured to output the low intensity light portion. The second cladding is arranged concentrically around the first cladding.

Another aspect of the disclosure provides a second method of free-space optical communication. The method includes receiving, at a position sensitive detector of a first communication terminal an optical communication beam emitted from an optical transmitter of a second communication terminal. The optical communication beam includes a high intensity light portion and a low intensity light portion concentric about the high intensity light portion. The method may also include determining, by signal processing hardware of the first communication terminal, an alignment error between the first communication terminal and the second communication terminal based on a sensed position of at least the low intensity light portion of the optical communication beam on the position sensitive detector. The method may also include altering, by positioning hardware, an optical receiver of the first communication terminal or the optical terminal transmitter of the second communication terminal based on the determined alignment error to better align the first communication terminal with the second communication terminal. The method also includes receiving, at the optical receiver of the first communication terminal, the data from at least the high intensity light portion of the light beam.

This aspect may include one or more of the following optional features. The high intensity light portion may be associated with a first divergence angle and the low intensity light portion may be associated with a second divergence angle, the first divergence angle may be less than the second divergence angle. The high intensity light portion of the optical communication beam may have a narrower field of view and a higher optical signal-to-noise ratio than the low intensity portion of the communication beam. The position sensitive detector may be at least one of a lateral position device, a charge-coupled device camera, or a quad-cell.

Yet another aspect of the disclosure provides a system for free-space optical communication. The system includes and optical transmitter, a double-clad optical fiber, focusing optics, and collimating optics. The optical transmitter is configured to emit an optical communication beam. The double-clad optical fiber has first and second ends. The focusing optics is disposed between the optical transmitter and the double-clad optical fiber. The collimating optics is configured to direct the optical communication beam from the second end of the double-clad optical fiber toward an optical receiver of a communication terminal. The double-clad optical fiber includes: a fiber core having a first numerical aperture; a first cladding arranged concentrically around the fiber core, the first cladding having a second numerical aperture equal to or greater than the first numerical aperture; and a second cladding arranged concentrically around the first cladding. The focusing optics configured to guide the optical communication beam emitted from the optical transmitter into the first end of the double-clad optical fiber. The fiber core is configured to propagate a high intensity portion of the optical communication beam from the first end of the double-clad optical fiber to the second end of the double-clad optical fiber. The first cladding is configured to propagate a low intensity portion of the optical communication beam from the first end of the double-clad optical fiber to the second end of the double-clad optical fiber. The collimated optical communication beam has a central portion including the high intensity portion of the optical communication beam and an outer portion concentric about the central portion, the outer portion including the low intensity portion of the optical communication beam.

This aspect may include one or more of the following optional features. The focusing optics may be configured to direct the high intensity portion of the optical communication beam from the optical transmitter into the fiber core of the double-clad optical fiber and direct the low intensity portion of the optical communication beam from the optical transmitter into the first cladding of the double-clad optical fiber. The optical transmitter may include a multi-mode light source. The fiber core may include a perturbator configured to couple the second portion of the optical communication beam from the fiber core to propagate in the first grating as a low intensity portion of the optical communication beam. The first portion of the optical communication beam may propagate in the fiber core as a high intensity portion of the optical communication beam. The perturbator may be configured to exert a diametric force on the double-clad optical fiber to cause a microbending loss of the fiber core, resulting in the coupling of the second portion of the optical communication beam from the fiber core to propagate in the first grating as the low intensity portion of the optical communication beam. The coupling ratio of the second portion of the optical communication beam to the first portion of the optical communication beam may depend on a strength of the diametric force and at least one period of at least one corresponding groove formed in the double-clad optical fiber due to the diametric force. The perturbator may also be configured to cause a speckle free, flat top type of output power profile of the optical communication beam as the optical communication beam exits the double-clad optical fiber.

In some examples, the optical transmitter includes a single-mode light source. The perturbator may include a long period grating configured to couple the second portion of the optical communication beam from the fiber core to propagate in the first grating. The coupling ratio of the second portion of the optical communication beam to the high intensity portion of the optical communication beam is such that the second portion of the optical communication beam may have a lower intensity than the low intensity portion of the optical communication beam at a threshold distance from the collimating optics. The positioning hardware may be configured to receive a position error from the communication terminal, the position error indicative of a misalignment between the collimating optics and the optical receiver of the communication terminal, and adjust an alignment of the collimating optics with the optical receiver of the communication terminal based on the position error.

In some implementations, the first portion of the optical communication beam has a narrower field of view and a higher optical signal-to-noise ratio than the second portion of the collimated optical communication beam. The collimating optics may include at least one of a lens, a shaped fiber tip at the first end of the double-clad optical fiber or a graded index fiber. The optical transmitter may include a laser diode, a light emitting diode, a fiber laser, or a solid state laser. The fiber core may include a single mode core or a multimode core.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A global-scale communication network may include optical links used to transfer data between communication devices. The communication devices may be positioned on buildings, on the ground, or on moving devices (e.g., high-altitude platforms or satellites). As such, the optical links are used to transfer the data between the buildings, the ground, and the moving devices. Each optical link allows for communication between two communication devices. A transmitting communication device is configured to transmit an optical beam, while a receiving communication device is configured to detect the optical beam from the transmitting communication device and thus form the optical link. In some examples, the transmitting communication device forms an optical link with the receiver communication terminal by using an optical beacon beam having a first portion and a second portion. The first portion has a higher intensity than the second portion of the optical beacon beam. In addition, the second portion of the optical beacon beam has a large divergence angle in comparison to a divergence angle of the first portion of the optical beacon beam and is concentrically around the first portion. In this case, the receiving communication terminal is more likely to detect the optical beacon from the transmitting communication terminal due to the second portion's divergence angle, which allows the two communication devices to more easily form an initial optical link (i.e., acquisition between the transmitting and receiving communication terminals).

Figure 1:
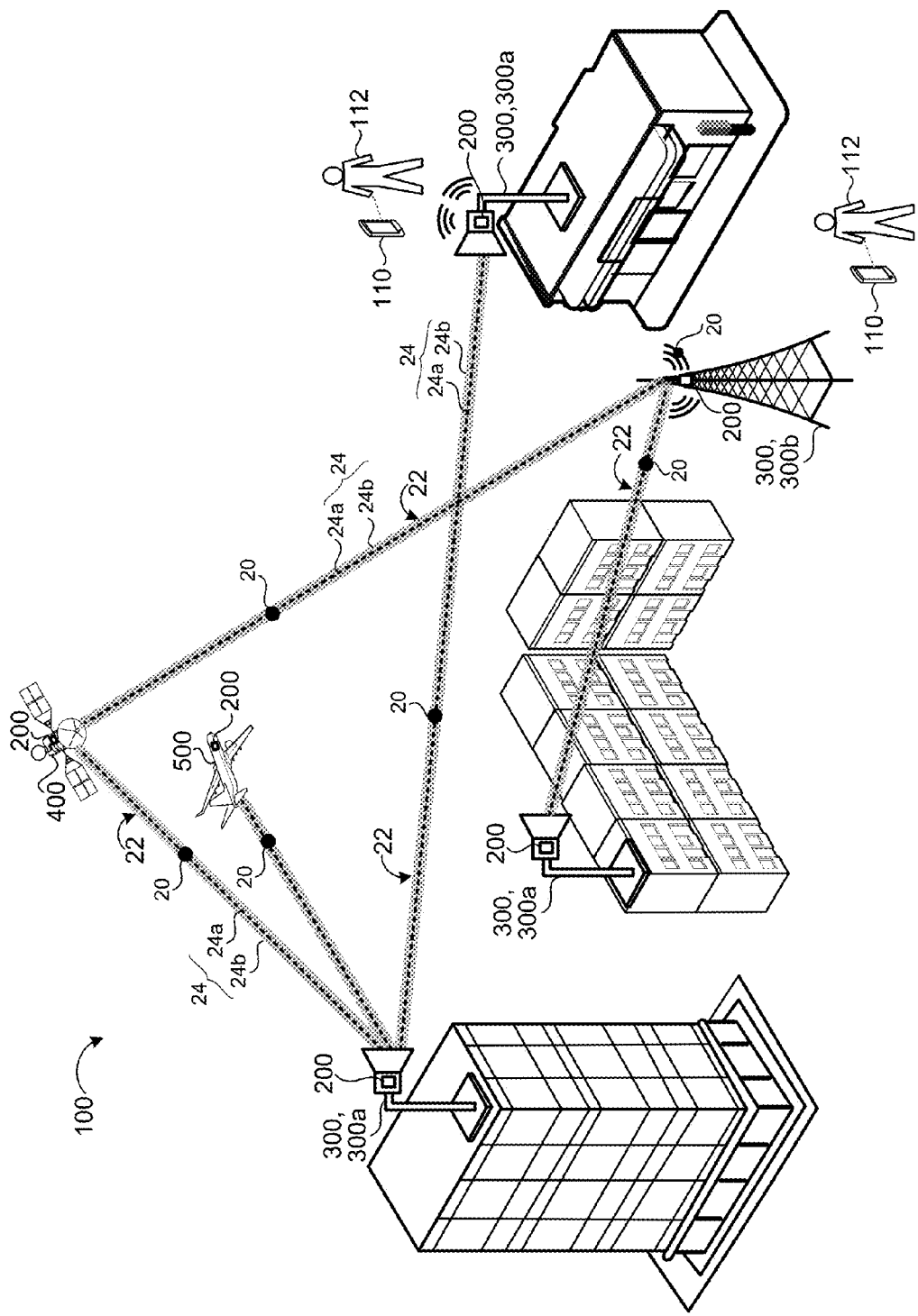
FIG. 1 is a schematic view of an example communication system.

Referring to FIG. 1, in some implementations, a global-scale communication network 100 includes communication devices 200 associated with stationary communication terminals 400, satellites 500, and high-altitude platforms (HAP) 600. The stationary communication terminals 400 may communicate with one another or with the satellites 500 by way of the communication device 200 associated with each one of the stationary terminal 400, the satellite 500, and the HAP 600. The stationary communication terminals 400 may be building stationary terminals 400a located on the rooftop of buildings or ground stationary terminal 400b located on the ground. The stationary communication terminals 400 may receive a communication 20 from another stationary terminal 400, a satellite 500, or a HAP 600, and reroute the communication 20 to another stationary terminal 400, a satellite 500, or a HAP 600, or in some examples, to one or more user devices 110, each associated with a user 112. The satellite 500 may be in Low Earth Orbit (LEO), Medium Earth Orbit (MEO), or High Earth Orbit (HEO), including Geosynchronous Earth Orbit (GEO). The network 100 may also include HAPs 500 that operate at high altitudes (e.g., 17-22 km). For instance, HAPs 500 may be released into the earth's atmosphere, e.g., by an air craft, or flown to the desired altitude. The global-scale communication network 100 uses free-space optical (FSO) communication, which is an optical communication technology that uses light propagating in free space to wirelessly transmit data for telecommunication or computer networking. The term "free space" refers to air, outer space, vacuum, or the like. Therefore, the global-scale communication network 100 transmits a communication 20 wirelessly between two communication terminals 400, 500, 600.

A communication device 200 is included in each of the stationary communication terminals 400, the satellites 500, and the HAPs 600 that use FSO communications. The communication device 200 is configured to establish a communication link 22 between two communication terminals 400, 500, 600 allowing a communication 20 to be transmitted from one communication terminal 400, 500, 600 to another. Once a communication link 22 is established between two communication devices 200, then a transiting communication device 200 may transmit a communication 20 to the other communication device 200. In some examples, when a first communication device 200 transmits a communication beam to establish a communication link 22 with a second communication device 200, it is desirable that the first communication device 200 accurately transmits the communication beam so that the second communication device 200 accurately receives the communication beam. In some examples, a beacon laser beam 24 is transmitted from the transmitting communication device 200 to establish the communication link 22 with the receiving communication device 200. The beacon laser beam 24 may illuminate a large solid angle in space allowing the receiving communication device 200 to locate the beacon laser beam 24 more rapidly due to its large diameter. In addition, it is desirable for the communication device 200 to output or transmit a beacon beam 24a that has a narrow-field-of view (NFOV) with a small divergence angle. In this case, the intensity of the NFOV beacon beam 24a is less spread out (than a beam with a larger divergence angle) at a far distance allowing the receiving communication device 200 to better acquire and track the NFOV beacon beam 24a. Due to its small divergence angle, the NFOV beacon beam 22a has a high signal-to-noise ratio. It is also desirable for the communication device 200 to output or transmit a wide-field-of view (WFOV) beacon beam 24b, so that the WFOV beacon beam 24b is large and can illuminate a large solid angle in the space allowing the receiving communication device 200 to easily locate and identify the WFOV beam 24b. Because of the different divergence requirements of the NFOV beacon beam 24a and the WFOV beacon beam 24b, the communication device 200 aligns the NFOV beacon beam 24a and the WFOV beam 24b co-linearly with the communication optical beam (not shown) that carries the communication 20. As such, when the receiving communication device 200 receives the beacon beam 24, the receiving communication device 200 closes a communication loop establishing a line-of-sight with the transmitting communication device 200. As a result, the optical link 22 that allows for the transmission of the communication beam (not shown) is established. The NFOV beam 24a and the WFOV beam 24b may share the same aperture, and in some examples, they share the same collimating optics. As such, the communication device 200 is a low cost, compact solution for the NFOV and WFOV beacon beams, 22, 22a, 22b to share the same aperture.

Figure 2:
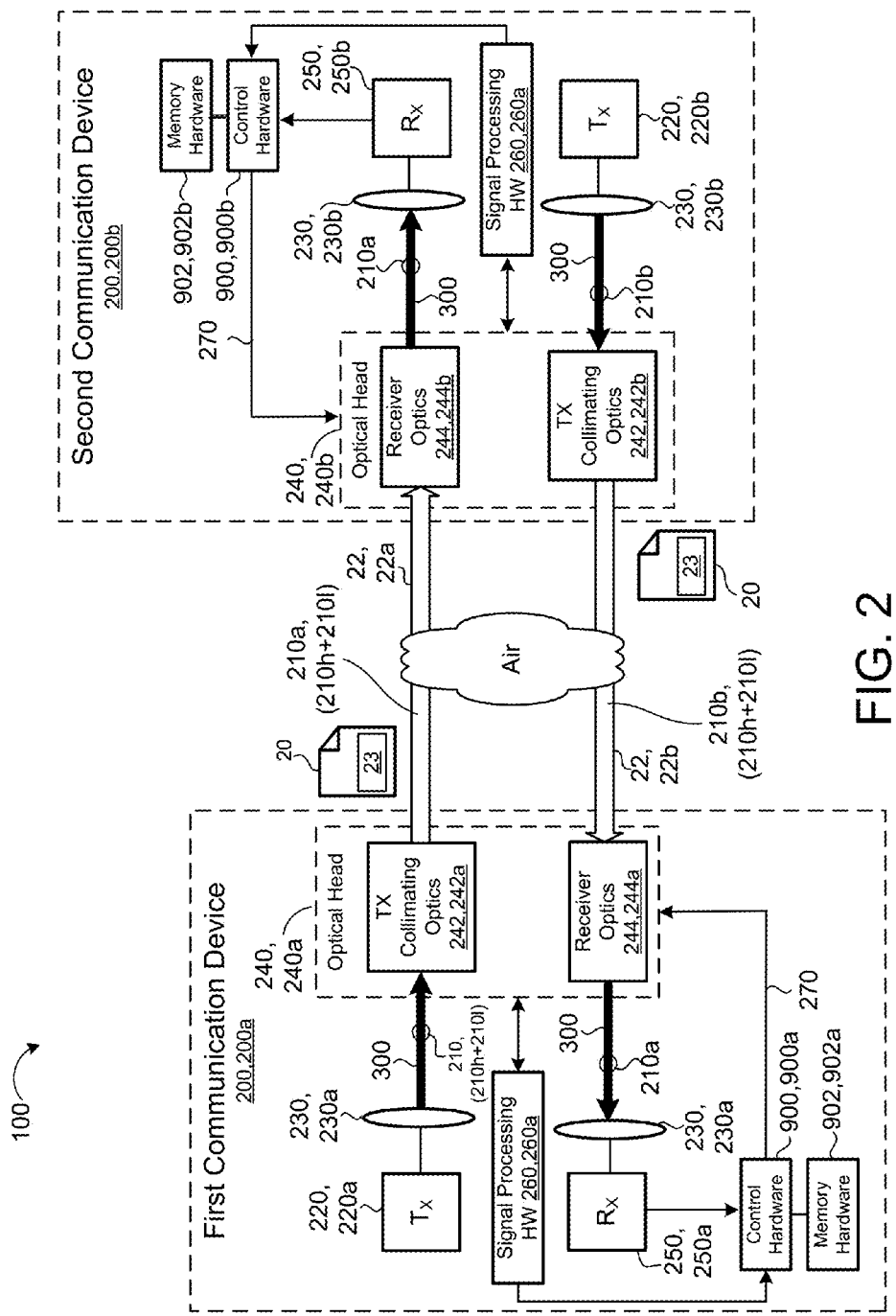
FIG. 2 is a schematic view of an example communication system providing optical signals through a free space optical link between a first communication terminal and a second communication terminal.

Referring to FIG. 2, in some implementations, the communication network 100 provides optical communications 20 between two communication devices 200, i.e., a first communication device 200a (hereinafter 'first device 200a') and a second communication device 200b (hereinafter 'second device 200b') through a free space optical link 22. The communication device 200 may be part of a stationary ground terminal 400 mounted on buildings or other non-moving or slow moving structures that do not require sophisticated acquisition and optical beam pointing systems required by fast moving terminals, such as satellites 500 and HAPs 600. The optical signals or communications 20 may include data 23, such as internet packets, being routed through the global-scale communication network 100. Each communication device 200, 200a, 200b may include, a transmitter module 220, 220a-b, focusing optics 230, 230a-b, an optical head 240, 240a-b, a receiver 250, 250a-b, control hardware 900, 900a-b, and memory hardware 902, 902a-b. The optical head 240 includes transmitter collimating optics 242, 242a-b and receiver optics 244, 244a-b. A double-clad optical fiber 300 transmits an optical signal 210, 210a from the focusing optics 230a to the transmitter optics 242a and from the receiver optics 244, 244a-b to the focusing optics 230, 230a.

The transmitter 220 may be a semi-conductor device, such as a light-emitting diode (LED) or a laser diode. The difference between the LED and laser diode is that LEDs produce incoherent light, while laser diodes produce coherent light. In some examples, the transmitter 220 is a fiber laser or a solid state laser. Laser diodes are usually directly modulated, or in other words, the light output is controlled by a current applied directly to the transmitter 220. The transmitter 220 may be a single-mode laser diode that supports one optical mode, or the transmitter 220 may be a multimode laser diode that supports multiple-transverse optical modes. An optical mode is a particular electromagnetic field pattern of radiation measured in a plane perpendicular (i.e., transverse) to the propagation direction of the beam. The transmitter 220 receives a modulated communication signal from a modulator (not shown), which in turn receives an electrical signal, and modulates the electrical signal. The transmitter 220 receives the modulated electrical signal, converts the electrical signal into an optical signal beam, and outputs the optical signal beam into an optical fiber towards the focusing optics 230. The transmitter 220 is configured to output a beacon beam 24 that allows the transmitter 220 of a communication device 200 to locate another communication device 200 and establish a link 22 with the other communication device 200. As such, the link 22 allows for communication 20 between the two communication devices 200.

The focusing optics 230 is disposed between the optical transmitter 220 and a double-clad optical fiber 300. The focusing optics 230 are configured to guide an optical beacon beam 210 (or communication beam (not shown)) emitted from the optical transmitter 230 into the double-clad optical fiber 300 (e.g., a first end 302 of the double-clad optical fiber 300). In other words, the output light (i.e., optical beam 210) from the transmitter 220 is coupled via the focusing optics 230 to the double clad fiber 300. The optical beacon beam 210 includes a high-intensity portion 210h (also referred to as a first portion 210h) and a low-intensity portion 210l (also referred to as a second portion 210l). In some examples, the focusing optics 230 are configured to direct the high-intensity portion 210h of the optical communication beam 210 from the optical transmitter 220 into a fiber core 310 of the double-clad optical fiber 300. In addition, the focusing optics 230 are configured to direct the low-intensity portion 210l of the optical communication beam 210 from the optical transmitter 220 into the first cladding 320 of the double-clad optical fiber 300.

The transmitter optics 242 transmit the optical beacon beam 210 (also referred to as an optical beam or optical communication beam) and the receiver optics 244 receive the optical beacon beam 210. As such the communication device 200 associated with the transmitter optics 242 forms an optical link 22 with another communication device 200 associated with the receiver 244. For example, the transmitter optics 242a at the first communication device 200a may transmit an optical beacon beam 210a, which the receiver optics 244a at the second communication device 200b locates and identifies to form a first communication link 22a. Once the first communication link 22a is formed, the first transmitter 220a can send communications 20 to the second receiver 244b. Similarly, the transmitter optics 242b at the second communication device 200b may transmit an optical beacon beam 210b, which the receiver optics 244a at the first communication device 200a locates and identifies to form a second communication link 22a. Once the second communication link 22b is formed, the second transmitter 220b can send communications 20 to the first receiver 244a. In some examples, it is sufficient to establish one communication link 22 between the first and second communication devices 220a, 220b, i.e., the optical head 240, 240a-b, which allows for the bi-directional transmission of data between both devices 200a, 200b.

The transmitter collimating optics 242 of the optical head 240 are configured to direct the optical beam 210 from the second end 304 of the double-clad optical fiber 300 toward an optical receiver 244, 244b of the second communication device 200b. The collimated optical communication beam 210 has a central portion 210h that includes the high intensity portion 210h of the optical communication beam 210 and an outer portion 210l concentric about the central portion 210h, the outer portion 210l including the low intensity portion 210l of the optical communication beam 210. In some implementations, the transmitter optics 242 include an adjustable lens set to adjust a beam divergence of the optical beam 210 when transmitting the optical signal 210. Beam divergence is an angular measure of the increase in beam diameter or radius with distance from an optical aperture from which the beam is outputted. For example, the optical beam 210 may include a highly divergent pilot optical beam 210 for transmission prior to establishing acquisition and optical beam pointing between the communication devices 200. Once the acquisition and optical beam pointing is established between the two communication devices 200, the transmitter optics 242 associated with the transmitting communication device 200 may reduce the divergence angle associated with the pilot beam 210 to optimize the optical beam 210 pointing between the communication devices 200. In other words, before establishing a link 22 between two communication devices 200, the transmitting communication device 200 may transmit a pilot beacon beam 210 having a first divergence. However, when the receiving communication device 200 identifies an established a link 22 with the transmitting device 200, then the transmitting device begins transmission of the beacon beam 210 having a second divergence that is less than the first divergence. As such, the receiving communication device 200 can easily locate the pilot beacon beam 210 having the larger divergence and once the link 22 is established, a smaller beacon beam 210 is needed to maintain the link 22.

The receiver optics 244, 244a-b of the optical head 240 provide the received optical signal 210 to the receiver 250. The receiver optics 244 and the receiver 250 may include, but are not limited to, a de-multiplexer, an optical pre-amplifier, photodiodes, the photo receiver, transimpedance amplifiers, clock/phase recovery circuits, decision circuits, and/or forward error correction circuits (e.g., de-multiplex or split) to the optical beam 210. The receiver optics 244 receive the optical beam 210 and transmit the optical beam 210 via the double-clad optical fiber 210 to the focusing optics 230, which in turn transmits the optical beam to the receiver 250.

The receiver 250 includes a light position sensing device to detect the optical beam 210. In some examples, the light position sensing device includes, but is not limited to, a lateral position device, a charge-coupled Device (CCD) camera, a photodetector, or a quad-cell, to detect the optical beacon laser. The receiver 250 converts the received optical beam 210 into an electric signal using the photoelectric effect.

In some examples, the communication device 200 includes a signal processing hardware 260, 260a-b in communication with the optical head 240 and the control hardware 900. The signal processing hardware 260 determines a position error indicative of a misalignment between the optical beam 210 outputted from the optical head 240 of an associated communication device 200 and the receiver 244 associated with a receiving communication device 200. As such, the signal processing hardware 260 may determine an adjusted position of the optical head 240 of the transmitting and/or receiving communication device 200 to establish a link 22.

The control hardware 900 may be in communication with the receiver 250 and the receiver optics 244. In some implementations, the control hardware 900 determines a signal strength of the received optical beam 210 received by the associated receiver optics 244 and provides pointing adjustments 270 to the receiver optics 244 and/or the transmitter optics 242 of the optical head 240 to establish acquisition and optical beam pointing with the other communication device 200. Accordingly, the control hardware 900 may provide closed loop control for the optical head 240 to adjust optical beam pointing (based on information from the signal processing hardware 260) at the associated communication device 200 based upon the signal strength for the received signal 210 received over the optical link 22 from the other communication device 200. The control hardware 900 is in communication with memory hardware 802 that stores information, such as instructions executable by the control hardware 900, non-transitorily at the control hardware 900.

FIGS. 3A-3E illustrate the double-clad optical fiber 300, which allows for the beacon beam 210 to have a high intensity center 210h surrounded by a low intensity edge 210l, making it easier for a receiver to locate the beacon beam 210. The double-clad optical fiber 300 has a first end 302 (e.g., an input end) and a second end 304 (e.g., an output end). The double-clad optical fiber 300 includes a first fiber core 310 that has a first numerical aperture NA-1. A numerical aperture (NA) of an optical system is a dimensionless number that characterizes a range of angles over which the system can accept or emit light. More specifically, in fiber optics, numerical aperture describes the range of angles within which light that is incident on the fiber may be transmitted along the fiber. The double-clad optical fiber 300 includes a first cladding 320 arranged concentrically around the fiber core 310. The first cladding 320 has a second numerical aperture NA-2 that is equal to or greater than the first numerical aperture NA-1 of the fiber core 310. Since the second numerical aperture NA-2 of the first cladding 320 is equal to or greater than the first numerical aperture NA-1 of the fiber core 310, the first cladding 320 describes a wider range of angles within which the optical beam 210 is incident on the fiber 300 may be transmitted along the fiber 300. The double-clad optical fiber 300 also includes a second cladding 330 arranged concentrically around the first cladding 320. The fiber core 310 is configured to propagate the high intensity portion 210h of the optical communication beam 210 from the first end 302 to the second end 304 of the double-clad optical fiber 300. In addition, the first cladding 320 is configured to propagate the low intensity portion 210l of the optical communication beam 320 from the first end 302 to the second end 304 of the double-clad optical fiber 300.

Figure 3A:
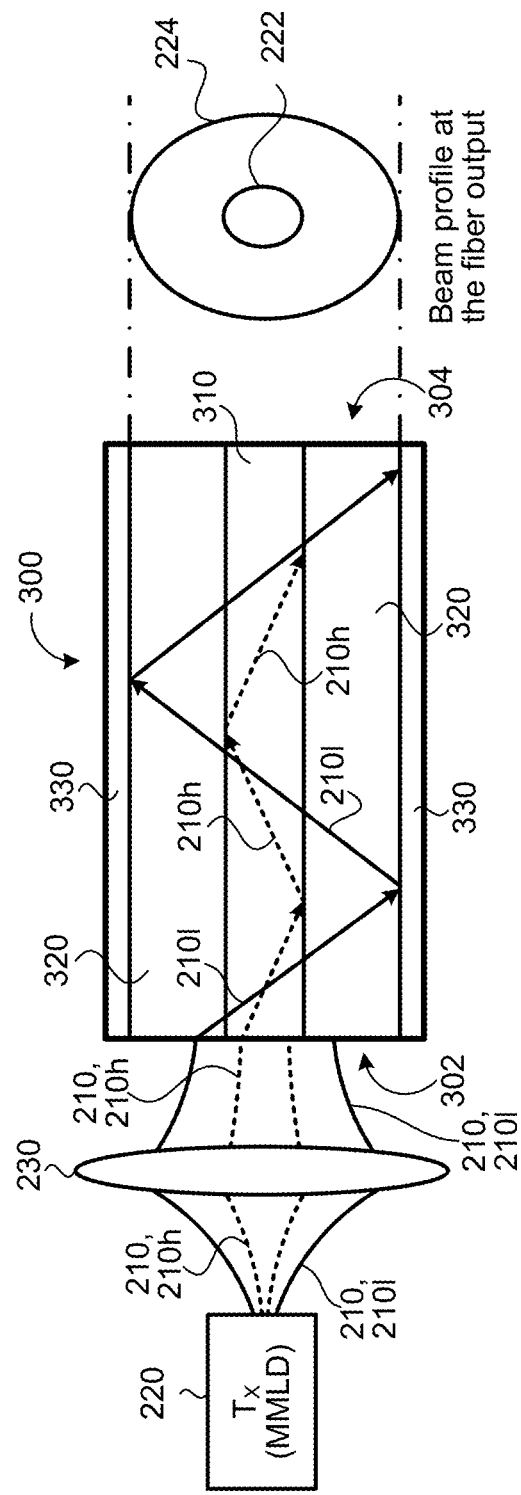
FIGS. 3A-3C are schematic views of an example double-clad optical fiber coupled to a double mode transmitter.
Figure 3B:
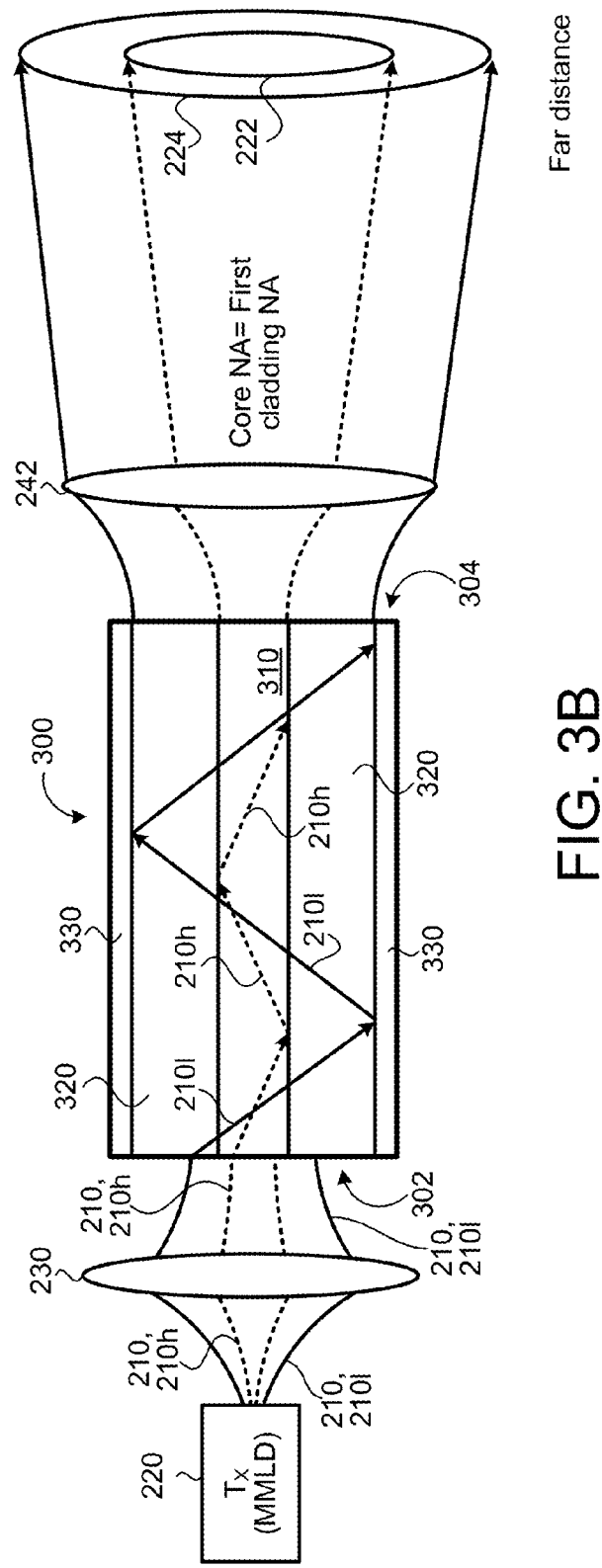

Referring to FIG. 3A, in some implementations, the output optical beam 210 from the transmitter 220 includes the high intensity beam 210h and the low intensity light 210l. In the example shown, the transmitter 220 is a multi-mode transmitter 220, such as a multi-mode laser diode, which emits a multimode optical beam 210. The output optical beam 210 from the transmitter 220 is coupled via the focusing element 230 to the double clad fiber 300. The output optical beam 210 from the transmitter 220 (e.g., the multi-mode transmitter) has a higher intensity of beam 210h at the center of the optical beam 210 and a lower intensity of optical beam 210l at the outer edges of the optical beam 210. When the optical beam 210 is coupled by the focusing element 230 to the double clad fiber 300, the high intensity beam 210h is coupled to and guided by the core 310 of the double-clad optical fiber 300, while the lower intensity light 210l is coupled to and guided by the first cladding 320. As a result, a beam profile associated with the optical beam 210 at the fiber output has a high intensity zone 222, or the "hot spot", at the center surrounded by a lower intensity beam 224, or the "warm zone". Referring to FIG. 3B, when the output optical beam 210 from the double clad fiber 300 is collimated by the transmitting collimating optics 242, the aspect ratio of the hot spot 222 and warm zone 224 may be adjusted by the collimating optics 242. As such, the adjusted aspect ratio of the hot spot 222 and warm zone 224 is preserved when the optical beam 210 is propagating in the free space, assuming the numerical aperture NA of the fiber core 310 and the first cladding 320 is the same. As a result, at a far distance, the beacon beam 210 has higher intensity "hot spot" at the center to serve as the NFOV beacon 210h and a warm zone at the outer ring with less intensity to serve as the WFOV beacon 210l.

Figure 3C:
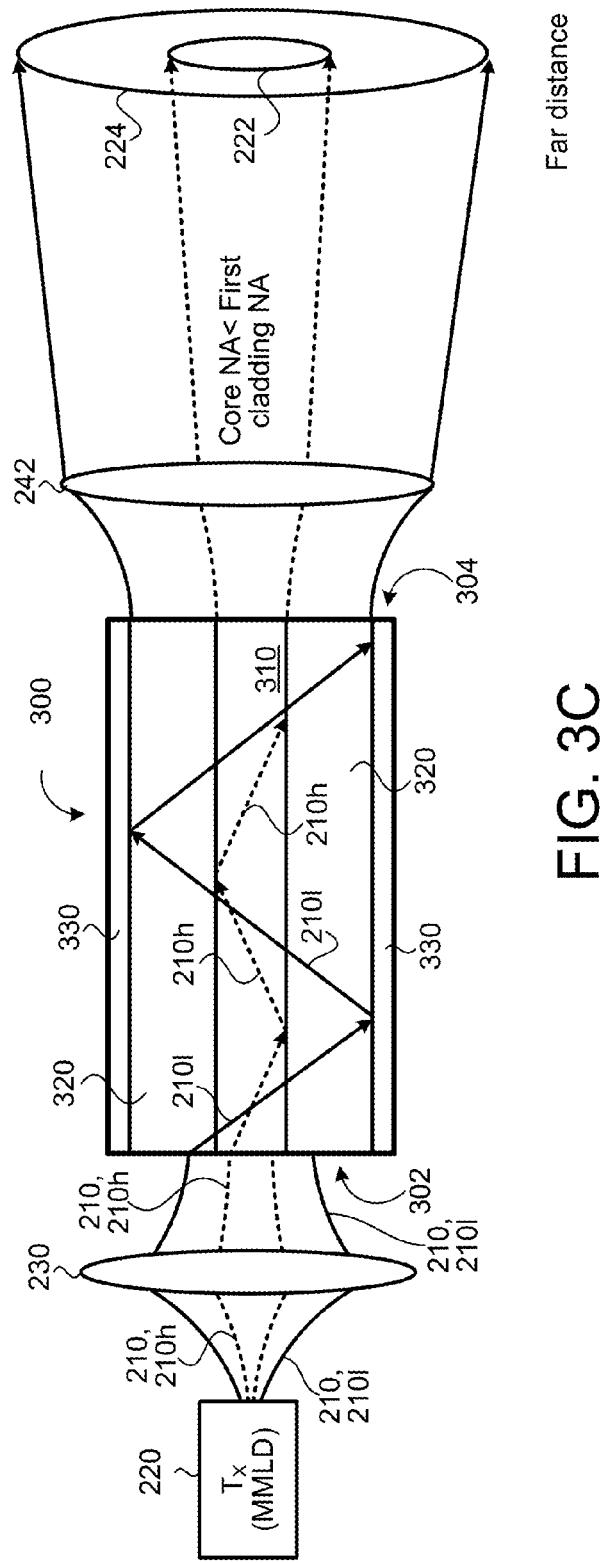

Referring to FIG. 3C, in some implementations, the core numerical aperture NA-1 of the core 310 is less than the numerical aperture NA-2 of the first cladding 320. In this case, the divergence angle of the optical beam 210 from the core (i.e., the high intensity beam 210h) after the collimating optics 242 is smaller than the optical beam 210 from the first cladding 320 (i.e., the low intensity beam 210l). As a result, at a far distance, the aspect ratio of the hot-spot 222 to the warm-zone 224 is further reduced to serve as a beacon laser beam 24 with even narrower field-of-view with higher intensity. The aspect ratio of the hot-spot 222 to the warm-zone 224 may be adjusted based on the location and distance between the communication devices 200 establishing a link 22. In addition, the aspect ratio of the hot-spot 222 to the warm-zone 224 may be adjusted after establishing a link 22, as previously discussed. As shown in FIGS. 3A-3C, the transmitter 220 is a multi-mode transmitter, such as, but not limited to a multimode laser diode. Examples of multimode laser diodes, include but are not limited to, solid state lasers, fiber lasers, or light emitting diodes, or any other transmitter configured to output a percentage of light coupled into the core 310 of the double-clad fiber 300 while the first cladding 320 collects most of the remaining light output 210.

Figure 3D:
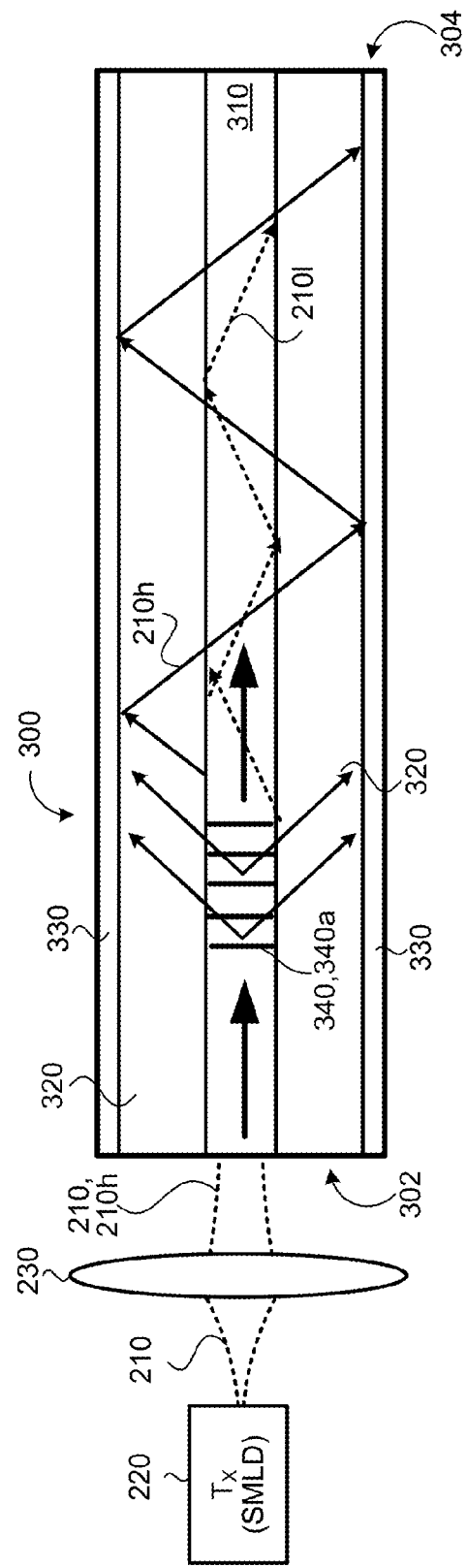
FIG. 3D is a schematic view of an example double-clad optical fiber having long period gratings and coupled to a double mode transmitter.
Figure 3E:
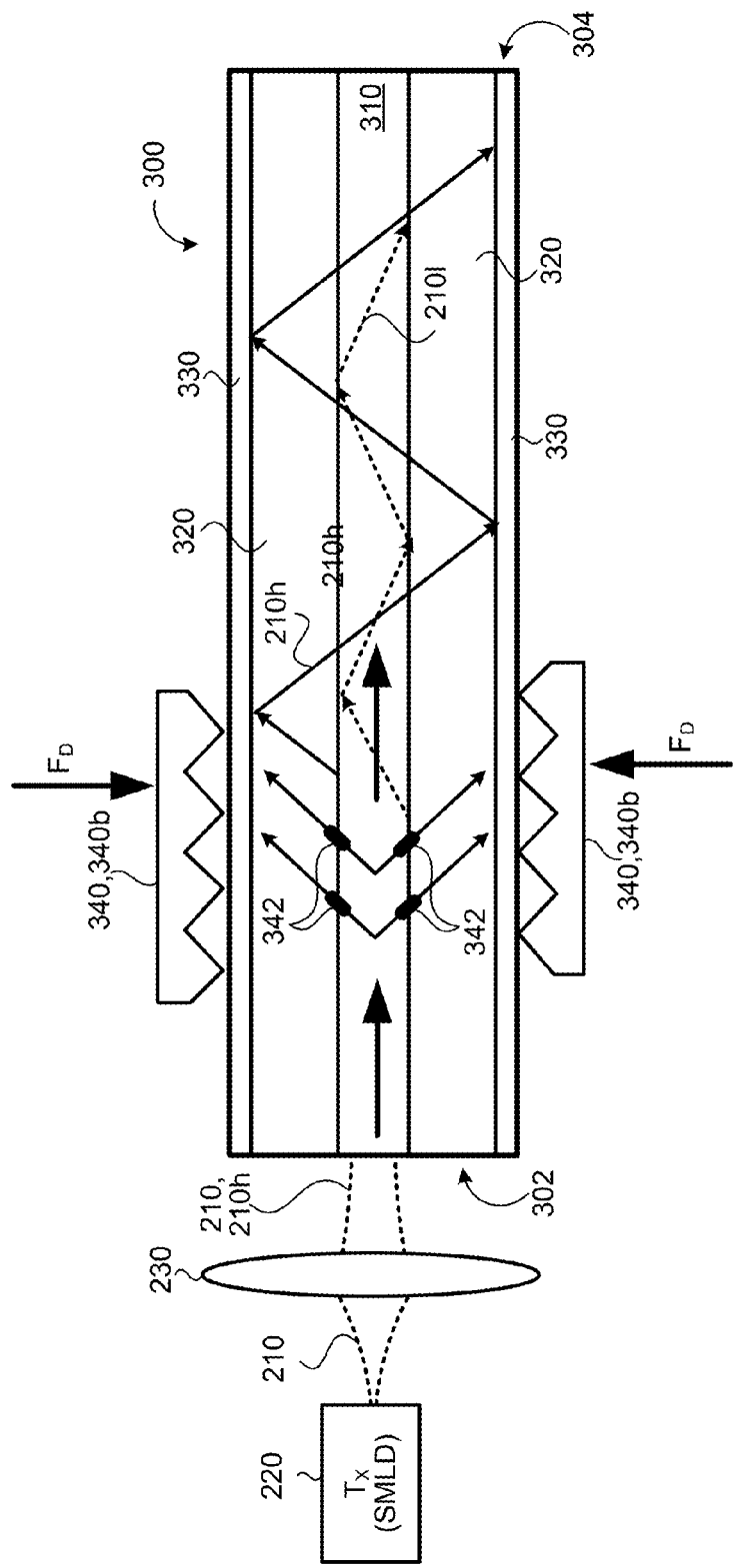
FIG. 3E is a schematic view of an example double-clad optical fiber having external mechanical stress device and coupled to a double mode transmitter.

FIGS. 3D and 3E illustrate an example double-clad fiber 300 in communication with a transmitter 220 being a single-mode laser diode transmitter. In this case, the double-clad fiber 300 receives a single-mode beam 210 from the transmitter 220 and a core perturbing mechanism 340 is used to strip part of the light 210 from the core 310 of the double-clad fiber 300 to the first cladding 320, which creates a hot-spot 222 and a warm zone 224. Therefore, instead of coupling part of a low intensity light 210l into a high intensity light 210h as shown in FIGS. 3A-3C, FIGS. 3D and 3E use a single mode optical beam 210 and most of the optical beam 210 from the transmitter 220 is coupled only to the core 310 of the double-clad fiber 300. Then a perturbing mechanism 340 is used to remove some of the light 210 from the core 310 to the first cladding 320 to create the hot spot 222 from the beam 210h in the core 310 and to create a warm zone 224 from the light 210l of the first cladding 320.

Referring to FIG. 3E, the double-clad fiber 300 includes a single-mode core that receives the beam 210 from the single-mode transmitter 220. The double-clad fiber 300 includes one or more long period gratings 340a used as the stripping mechanisms 340. The long period gratings 340a are used at the core 310 of the double-clad fiber 300 to strip part of the light beam 210 from the core 310 to the first cladding 320. The stripped off light 210l is then guided by the first cladding 320. The long-period fiber grating 340a couples optical beams 210 from a guided mode (i.e., the core 310) into forward propagating cladding modes where the optical beam is lost due to absorption and scattering. The coupling from the guided mode to cladding modes is wavelength dependent, so the double-clad fiber 300 may be designed based on the specific cladding modes (i.e., the high intensity beam 210h). The ratio of optical beam 210 being removed from the core 310 to the first cladding 320 is dependent on the design of the long period grating, such as the length, the periods, and the index contrast of the grating. As a band rejection filter, the long period grating 340a may discard all light in a spectral slice without affecting the amplitude and phase of neighboring wavelengths, with the additional advantage of low insertion losses and minimum back-reflection.

Referring to FIG. 3E, an external mechanical stress device 340b may be used as the core perturbing mechanism 340 to create micro-bending loss of the optical beam 210 from the core 310. The mechanical stress device 340b applies a diametric force FD about the double-clad fiber 300, which results in the core 310 having one or more grooves 342. The grooves 342 leak a portion of the optical beam 210 from the core 310 to the first cladding 320. When a portion of the optical beam 210, i.e., the low intensity optical portion 210l leaks through the grooves 342 to the first cladding 320, the first cladding 320 guides the low intensity optical portion 210l through the dual-core fiber 300 to its second end 304. The ratio of the optical beam 210h remaining in the core 310 to the optical beam 210l guided by the first cladding 320 is dependent on the strength of the mechanical stress 340b and the periods of the mechanical grooves 342 that create the micro-bending loss. In some examples, the mechanical stress device 340b is configured to adjust a clamping force applied to the dual-core fiber 300, which results in the ratio of optical beam 210h in the core and the optical beam 210l in the first cladding 320 adjustable. As such, the ratio of optical beam 210h in the core and the optical beam 210l depend upon the force or strength of the force (i.e., diametric force $F_D$) and at least one period of at least one corresponding groove 342. Other mechanisms may be used as the core perturbing mechanism 340, such as, but not limited to, an offset splice to create a discontinuity of the core, or a tightly looped fiber to create macro-bending loss of the core.

Figure 4B:
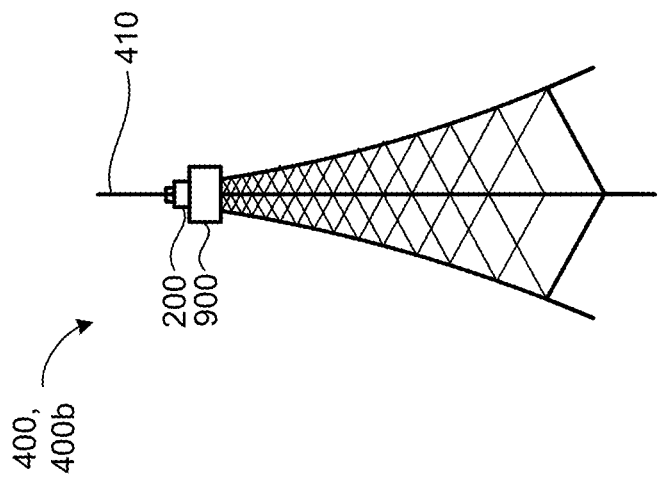
FIGS. 4A and 4B are perspective views of example stationary communication terminals that include a communication device having the double-clad optical fiber.
Figure 4A:
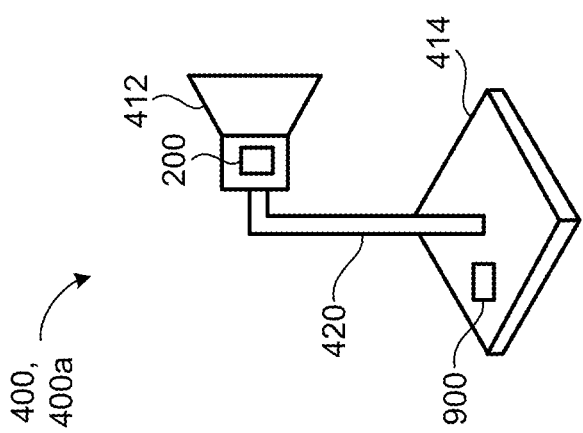

Referring to FIGS. 4A and 4B, in some implementations, the communication terminal 400 includes a communication device 200 that receives the communication 20 from another communication terminal 400, a satellite 500, or a HAP 600 and transmits the communication 20 to another communication terminal 400, satellite 500, or HAP 600. The communication terminal 400 may include control hardware 900 that processes the received communication 20 and establishes acquisition and tracking with the other communication terminal 200, satellite 500, or HAP 600. In some implementations, two stationary communication terminals 400 are capable of communicating with one another by transmitting optical beams 210 220 through a free space optical link 22. The stationary communication terminals 400 may establish acquisition and tracking with one another without using position sensors, fast steering mirrors, and/or fast gimbals that are employed by sophisticated acquisition and tracking systems required by communication terminals that move fast and relative to one another.

FIG. 4A illustrates an example building stationary terminal 400a that includes a base 414 and a reflector 412 supported by the base 414. The building stationary terminal 400a also includes the communication device 200, and control hardware 900 (as described above) in communication with the communication device 200. In some examples, the control hardware 900 is associated with pointing steering hardware (e.g., a gimbal) for adjusting the optical head 240 to point toward the other communication device 200. The base 414 may mount the building stationary terminal 400a on a building.

FIG. 4B illustrates an example ground stationary terminal 400b that also includes the communication device 200 and control hardware 900. The control hardware 900 of the ground stationary terminal 400b may also adjust the optical head 240 to establish acquisition and optical beam pointing with the other terminals 400, 500, 600 based on a signal strength of the received optical beam 210 received from the other communication device 200.

Figure 5:
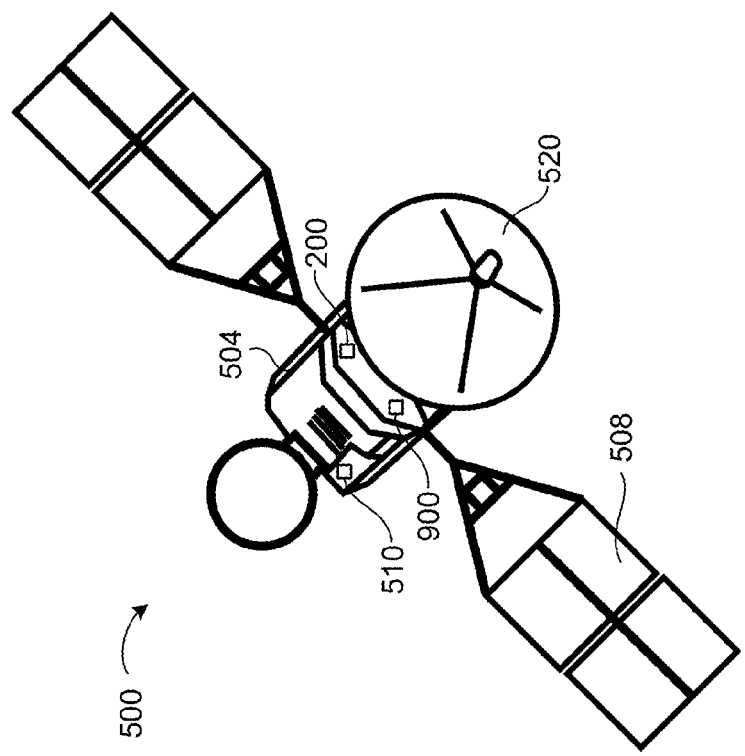
FIG. 5 is a perspective view of an example satellite that includes a communication device having the double-clad optical fiber.

Referring to FIG. 5, a satellite 500 is an object placed into orbit around the earth and may serve different purposes, such as military or civilian observation satellites, communication satellites, navigations satellites, weather satellites, and research satellites. The orbit of the satellite 500 varies depending in part on the purpose of the satellite 500. Satellite orbits may be classified based on their altitude from the surface of the earth 30 as Low Earth Orbit (LEO), Medium Earth Orbit (MEO), and High Earth Orbit (HEO). LEO is a geocentric orbit (i.e., orbiting around the earth) that ranges in altitude from zero to 1,240 miles. MEO is also a geocentric orbit that ranges in altitude from 1,200 mile to 22,236 miles. HEO is also a geocentric orbit and has an altitude above 22,236 miles. Geosynchronous Earth Orbit (GEO) is a special case of HEO. Geostationary Earth Orbit (GSO, although sometimes also called GEO) is a special case of Geosynchronous Earth Orbit. Satellites 500 placed in the GEO orbit can "stand still" with respect to a certain location on earth. Thus, a person on earth looking at a satellite 500 in the GEO orbit would perceive that the satellite 500 is not moving. Therefore, the satellites 500 in GEO orbit maintain a position with respect to a location on earth. Thus, a stationary terminal 400 communicating with a satellite 500 in the GEO orbit does not need to keep tracking the satellite 500 as it moves, it only needs to point to a direction of the satellite 500 in its stationary position with respect to the stationary terminal 400.

In some implementations, the satellite 500 includes a satellite body 504 having a payload that includes a communication device 200. The communication device 200 of the satellite 500 receives the communication 20 from another communication terminal 200, a satellite 500, or a HAP 600 and transmits the communication 20 to another communication terminal 400, satellite 500, or HAP 600.

The satellite also includes control hardware 900 that processes the received communication 20 and establishes acquisition and tracking with other communication terminal 200, satellites 500, or HAPs 500. In some examples, control hardware 900 executes algorithms to determine where the satellite 500 is heading. The satellite 500 also includes an antenna 520 for receiving and transmitting the communication 20. The satellite 500 includes solar panels 508 mounted on the satellite body 504 for providing power to the satellite 500. In some examples, the satellite 500 includes rechargeable batteries used when sunlight is not reaching and charging the solar panels 508.

In some examples, the satellite 500 includes batteries to operate the satellite 500 when the solar panels 508 of the satellite 500 are hidden from the sun due to the earth, the moon, or any other objects. In some examples, the satellite 500 also includes a reaction control system (RCS) that uses thrusters to adjust the altitude and translation of the satellite 500 making sure that the satellite 500 stays in its orbit. The RCS may provide small amounts of thrusts in one or more directions and torque to allow control of the rotation of the satellite 500 (i.e., roll, pitch, and yaw).

In some implementations, the satellite 500 includes tracking, telemetry, command and ranging (TT&R) that provides a connection between the satellite 500 and stationary terminals 400, other satellites 500, or the HAPs 500. The TT&R ensures that the satellite 500 establishes communication or a link 22 to successfully receive/transmit a communication 20. The TT&R performs several operations, including, but not limited to, monitoring the health and status of the satellite 500. Another operation includes determining the satellite's exact location by way of receiving, processing, and transmitting of communications 20. Yet another operation of the TT&R includes properly controlling the satellite 500 through the receiving, processing, and implementing of commands transmitted from the stationary terminals 400. In some examples, a ground operator controls the satellite 500; however, such an intervention by the operator is only minimal or in case of an emergency and the satellite 500 is mostly autonomous.

Figure 6:
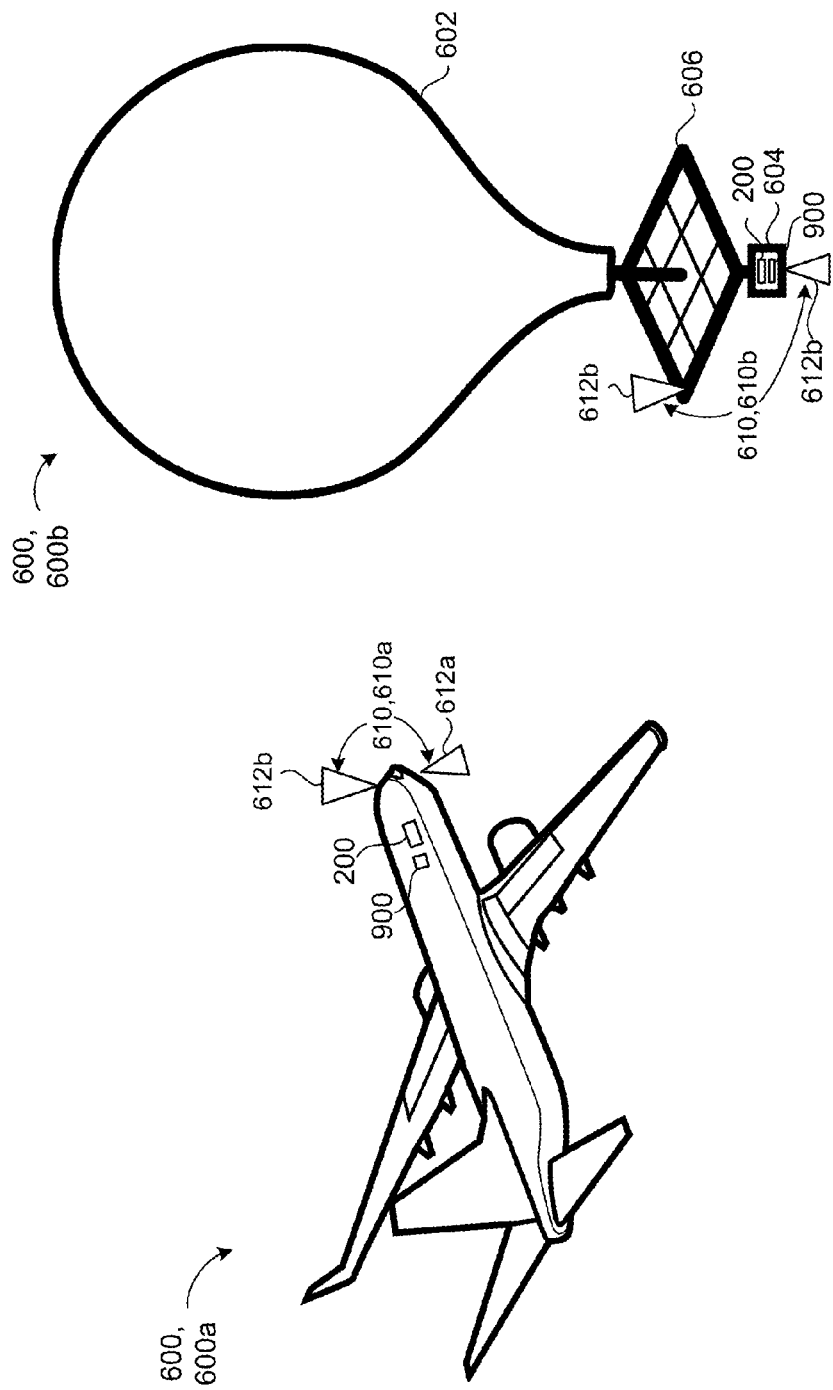
FIG. 6A is a perspective view of an example aircraft that includes a communication device having the double-clad optical fiber.
FIG. 6B is a perspective view of an example high-altitude balloon that includes a communication device having the double-clad optical fiber.

Referring to FIGS. 6A and 6B, in some implementations, the HAP 600, 600a, 600b includes the communication device 200. The communication device 200 of the HAP 600 receives the communication 20 from another communication terminal 200, a satellite 500, or a HAP 600 and transmits the communication 20 to another communication terminal 200, satellite 500, or HAP 600. The HAP 600 may include control hardware 900 that processes the received communication 20 and establishes acquisition and tracking with the other communication terminal 200, satellite 500, or HAP 600. The HAP 600, 600a, 600b includes an antenna system 610, 610a, 610b that receives/transmits a communication 20. The antenna system 610 may include a first antenna 612a that receives/transmits a communication 20 from the ground terminal 400, and a second antenna 412b that receives/transmits a communication from a satellite 500. The HAP 600, 600a, 500b includes the communication device 200. In some examples, and as previously discussed, the satellite 500 and/or the HAP 600 is moving; therefore, the antenna system 410 of the HAP 500 needs to track a position of one or more satellites 500 to maintain a communication link 22 between the HAP 600 and the satellite 500.

FIG. 6A illustrates an example aircraft 600a, such as an unmanned aerial vehicle (UAV). A UAV, also known as a drone, is an aircraft without a human pilot onboard. There are two types of UAVs, autonomous aircrafts and remotely piloted aircraft. As the name suggests, autonomous aircrafts are designed to autonomously fly, while remotely piloted aircrafts are in communication with a pilot who pilots the aircraft. In some examples, the aircraft 500a is remotely piloted and autonomous at the same time. The UAV usually includes wings to maintain stability, a GPS system to guide it through its autonomous piloting, and a power source (e.g., internal combustion engine or electric battery) to maintain long hours of flight. In some examples, the UAV is designed to maximize efficiency and reduce drag during flight. Other UAV designs may be used as well.

FIG. 6B illustrates an example communication balloon 600b that includes a balloon 602 (e.g., sized about 49 feet in width and 39 feet in height and filled with helium or hydrogen), an equipment box 604, and solar panels 408. The equipment box 604 includes the control hardware 900 that processes the received communication 20 and establishes acquisition and tracking with the other communication terminal 200, satellite 500, or HAP 600. In some examples, the control hardware executes algorithms to determine where the high-altitude balloon 500a needs to go, then each high-altitude balloon 500b moves into a layer of wind blowing in a direction that may take it where it should be going. The equipment box 604 also includes batteries to store power and the transceiver 420 to communicate with other devices (e.g., other HAPs 600, satellites 500, stationary terminals 400). The solar panels 606 may power the equipment box 604.

Communication balloons 600b are typically released in to the earth's stratosphere to attain an altitude between 11 to 23 miles and provide connectivity for a ground area of 25 miles in diameter at speeds comparable to terrestrial wireless data services (such as, 3G or 4G). The communication balloons 600b float in the stratosphere, at an altitude twice as high as airplanes and the weather (e.g., 20 km above the earth's surface). The communication balloons 500a are carried around the earth by winds and can be steered by rising or descending to an altitude with winds moving in the desired direction. Winds in the stratosphere are usually steady and move slowly at about 5 and 20 mph, and each layer of wind varies in direction and magnitude.

Figure 7:
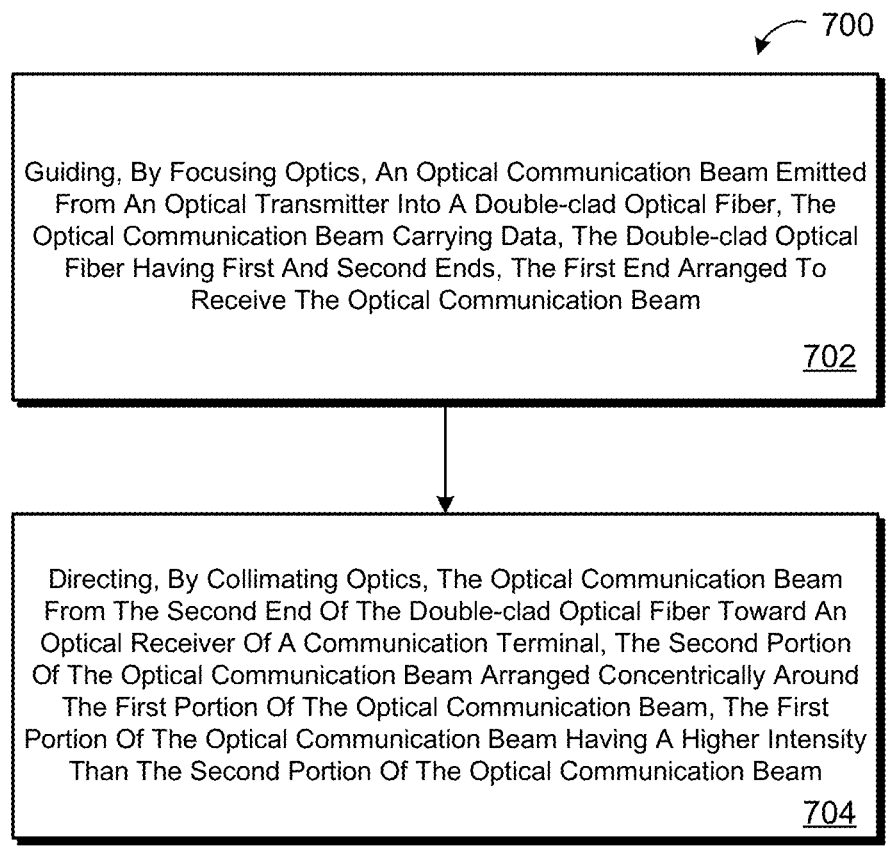
FIG. 7 is a schematic view of an exemplary arrangement of operations for establishing a communication link between two communication terminals.

FIG. 7 illustrates an exemplary arrangement of operations for a method 700 of establishing a communication link 22 in free-space optical communication from a communication terminal 400, 500, 600 (e.g., having a communication device 200). At block 702, the method 700 includes guiding, by focusing optics 230, 230a-b, an optical communication beam 210 emitted from an optical transmitter 220, 220a-b into a double-clad optical fiber 300. At block 704, the method 700 includes directing, by collimating optics 242, 242a-b, the optical communication beam 210 from the second end 304 of the double-clad optical fiber 300 toward an optical receiver 250, 250a-b of a communication terminal 400, 500, 600. The optical communication beam 210 carries data 23, the double-clad optical fiber 300 has a first and second end 302, 304, and the first end 302 is arranged to receive the optical communication beam 210. The double-clad optical fiber 300 includes a fiber core 310 having a first numerical aperture NA-1, a first cladding 320 arranged concentrically around the fiber core 310, and a second cladding 330 arranged concentrically around the first cladding 320. The fiber core 310 is configured to propagate a first portion 210h of the optical communication beam 210 from the first end 302 of the double-clad optical fiber 300 to the second end 304 of the double-clad optical fiber 300. The first cladding 320 has a second numerical aperture NA-2 equal to or greater than the first numerical aperture NA-1. The first cladding 320 is configured to propagate a second portion 210l of the optical communication beam 210 from the first end 302 of the double-clad optical fiber 300 to the second end 304 of the double-clad optical fiber 300. The second portion 210l of the optical communication beam 210 is arranged concentrically around the first portion 210h of the optical communication beam 210. The first portion 210h of the optical communication beam 210 has a higher intensity than the second portion 210l of the optical communication beam 210.

In some implementations, the focusing optics 230, 230a-b are configured to direct the first portion 210h of the optical communication beam 210 from the optical transmitter 220, 220a-b into the fiber core 310 of the double-clad optical fiber 300. In addition, the focusing optics 230, 230a-b are configured to direct the second portion 210l of the optical communication beam 210 from the optical transmitter 220, 220a-b into the first cladding 320 of the double-clad optical fiber 300. The method 700 may also include perturbing the fiber core 310 to couple the second portion 210l of the optical communication beam 210 from the fiber core 310 to propagate in the first grating as a low intensity portion 210l of the optical communication beam 210. The first portion 210h of the optical communication beam 210 propagates in the fiber core 310 as a high intensity portion 210h of the optical communication beam 210. The perturbation of the fiber core 310 may include exerting a diametric force $F_D$ on the double-clad optical fiber 300 to cause a microbending loss of the fiber core 310. The microbending loss of the fiber core 310 results in the coupling of the second portion 210l of the optical communication beam 210 from the fiber core 310 to propagate in the first grating as the low intensity portion of the optical communication beam 210. A coupling ratio of the second portion 210l of the optical communication beam 210 to the first portion 210h of the optical communication beam 210 depends on a strength of the diametric force and at least one period of at least one corresponding groove formed in the double-clad optical fiber 300 due to the diametric force $F_D$. The perturbation of the fiber core 310 may cause a speckle free, flat top type of output power profile of the optical communication beam 210 as the optical communication may exit the double-clad optical fiber 300. The optical transmitter 220, 220a-b may include a single-mode light source.

In some examples, the method 700 includes coupling, by a long period grating 340a, the second portion 210l of the optical communication beam 210 from the fiber core 310 to propagate in the first grating 320 as a low intensity portion 210l of the optical communication beam 210. The first portion 210h of the optical communication beam 210 may propagate in the fiber core 310 as a high intensity portion 210h of the optical communication beam 210. A coupling ratio of the second portion 210l of the optical communication beam 210 to the first portion 210h of the optical communication beam 210 may be such that the second portion 210l of the optical communication beam 210 has a lower intensity than the first portion 210h of the optical communication beam 210 at a threshold distance from the collimating optics 242, 242a-b. In some examples, the method 700 includes receiving, at positioning hardware (i.e., control hardware 900), a position error from the communication terminal 400, 500, 600. The position error is indicative of a misalignment between the collimating optics 242, 242a-b and the optical receiver 250, 250a-b of the communication terminal 400, 500, 600. The method 700 also includes adjusting, by the positioning hardware 900, an alignment of the collimating optics 242, 242a-b with the optical receiver 250, 250a-b of the communication terminal 400, 500, 600 based on the position error. The first portion 210h of the optical communication beam 210 may have a narrower field of view and a higher optical signal-to-noise ratio than the second portion of the collimated optical communication beam 210.

The collimating optics 242, 242a-b may include at least one of a lens, a shaped fiber tip at the first end 302 of the double-clad optical fiber 300, or a graded index fiber. The optical transmitter 220, 220a-b may include a laser diode, a light emitting diode, a fiber laser, or a solid state laser. The optical transmitter 220, 220a-b may modulate the optical communication beam 210 to encode the data in the optical communication beam 210. The fiber core 310 may include a single mode core 310 or a multimode core 310.

Figure 8:
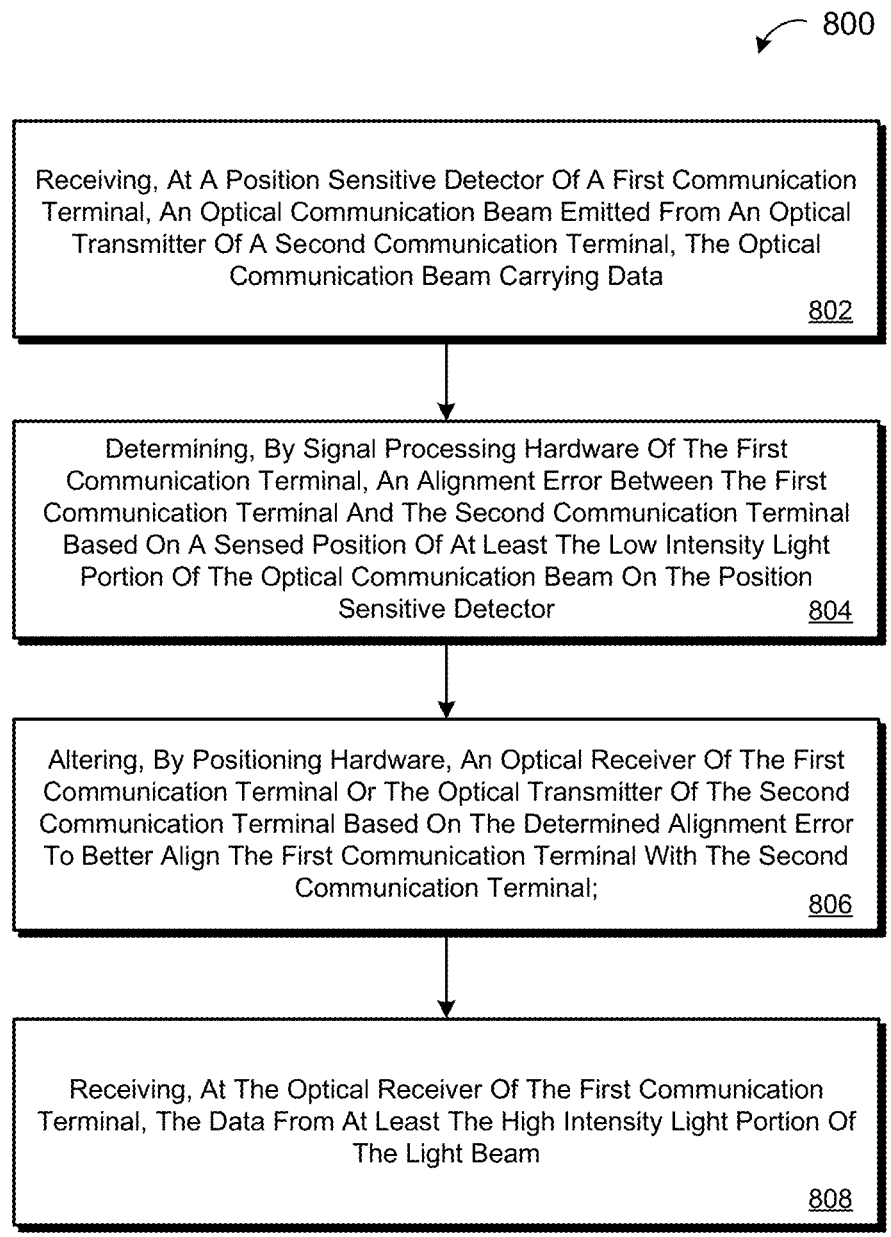
FIG. 8 is a schematic view of an exemplary arrangement of operations for receiving and identifying a communication link from a communication terminal.

FIG. 8 illustrates an exemplary arrangement of operations for a method 800 of receiving and identifying a communication link 22 in free-space optical communication from a communication terminal 400, 500, 600 (e.g., having a communication device 200). At block 802, the method 800 includes receiving, at a position sensitive detector (e.g., receiver 250, 250a-b) of a first communication terminal 400, 500, 600 an optical communication beam 210 emitted from an optical transmitter 220, 220a-b of a second communication terminal 400, 500, 600. The optical communication beam 210 includes a high intensity light portion 210h and a low intensity light portion 210l concentric about the high intensity light portion 210h. At block 804, the method 800 also includes determining, by signal processing hardware 260, 260a-b of the first communication terminal 400, 500, 600, an alignment error between the first communication terminal 400, 500, 600 and the second communication terminal 400, 500, 600 based on a sensed position of at least the low intensity light portion 210l of the optical communication beam 210 on the position sensitive detector 250, 250a-b. At block 806, the method 800 includes altering, by positioning hardware 900, an optical receiver 250, 250a-b of the first communication terminal 400, 500, 600 or the optical terminal transmitter of the second communication terminal 400, 500, 600 based on the determined alignment error to better align the first communication terminal 400, 500, 600 with the second communication terminal 400, 500, 600. At block 808, the method 800 also includes receiving, at the optical receiver 250, 250a-b of the first communication terminal 400, 500, 600, the data 23 from at least the high intensity light portion 210h of the light beam 210. The high intensity light portion 210h may be associated with a first divergence angle and the low intensity light portion 210l may be associated with a second divergence angle. The first divergence angle may be less than the second divergence angle. The high intensity light portion 210h of the optical communication beam 210 may have a narrower field of view and a higher optical signal-to-noise ratio than the low intensity portion of the communication beam 210. The position sensitive detector 250, 250a-b may be at least one of a lateral position device, a charge-coupled device camera, or a quad-cell.

Figure 9:
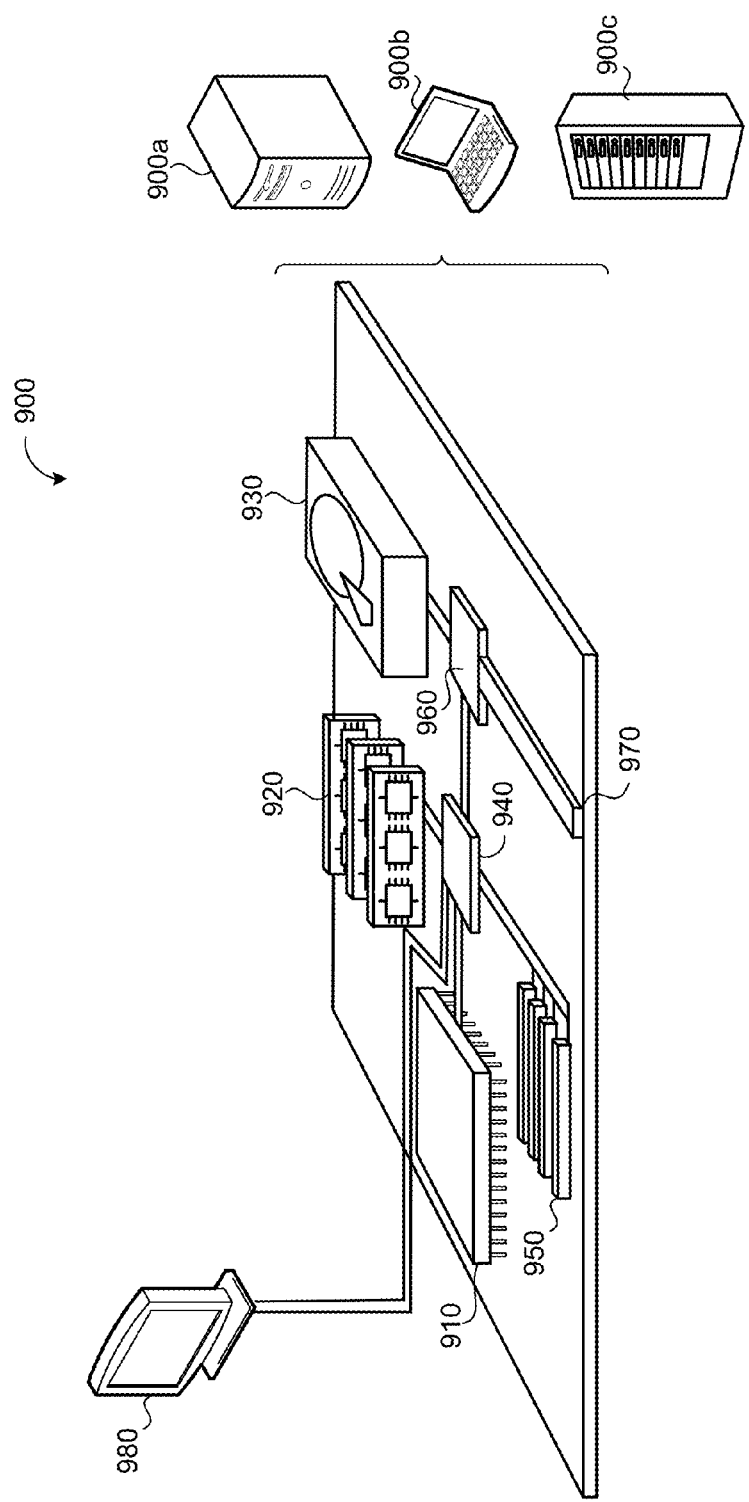
FIG. 9 is a schematic view of an example computing device executing any systems or methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to low speed bus 970 and storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and low-speed expansion port 970. The low-speed expansion port 970, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of free-space optical communication, the method comprising:
   guiding, by focusing optics, an optical communication beam emitted from an optical transmitter into a double-clad optical fiber, the optical communication beam carrying data, the double-clad optical fiber having first and second ends, the first end arranged to receive the optical communication beam, the double-clad optical fiber comprising:
     a fiber core having a first numerical aperture, the fiber core configured to propagate a first portion of the optical communication beam from the first end of the double-clad optical fiber to the second end of the double-clad optical fiber;
     a first cladding arranged concentrically around the fiber core, the first cladding having a second numerical aperture equal to or greater than the first numerical aperture, the first cladding configured to propagate a second portion of the optical communication beam from the first end of the double-clad optical fiber to the second end of the double-clad optical fiber; and
     a second cladding arranged concentrically around the first cladding; and
   directing, by collimating optics, the optical communication beam from the second end of the double-clad optical fiber toward an optical receiver of a communication terminal, the second portion of the optical communication beam arranged concentrically around the first portion of the optical communication beam, the first portion of the optical communication beam having a higher intensity than the second portion of the optical communication beam,
   wherein the focusing optics are configured to:
     direct the first portion of the optical communication beam from the optical transmitter into the fiber core of the double-clad optical fiber; and
     direct the second portion of the optical communication beam from the optical transmitter into the first cladding of the double-clad optical fiber.

2. The method of claim 1, wherein the optical transmitter comprises a multi-mode light source.

3. A method of free-space optical communication, the method comprising:
   guiding, by focusing optics, an optical communication beam emitted from an optical transmitter into a double-clad optical fiber, the optical communication beam carrying data, the double-clad optical fiber having first and second ends, the first end arranged to receive the optical communication beam, the double-clad optical fiber comprising:
     a fiber core having a first numerical aperture, the fiber core configured to propagate a first portion of the optical communication beam from the first end of the double-clad optical fiber to the second end of the double-clad optical fiber;
     a first cladding arranged concentrically around the fiber core, the first cladding having a second numerical aperture equal to or greater than the first numerical aperture, the first cladding configured to propagate a second portion of the optical communication beam from the first end of the double-clad optical fiber to the second end of the double-clad optical fiber; and
     a second cladding arranged concentrically around the first cladding;
   perturbing the fiber core to couple the second portion of the optical communication beam from the fiber core to propagate in a fiber grating as a low intensity portion of the optical communication beam, the first portion of the optical communication beam propagating in the fiber core as a high intensity portion of the optical communication beam; and
   directing, by collimating optics, the optical communication beam from the second end of the double-clad optical fiber toward an optical receiver of a communication terminal, the second portion of the optical communication beam arranged concentrically around the first portion of the optical communication beam, the first portion of the optical communication beam having a higher intensity than the second portion of the optical communication beam.

4. The method of claim 3, wherein the perturbation of the fiber core comprises exerting a diametric force on the double-clad optical fiber to cause a microbending loss of the fiber core, resulting in the coupling of the second portion of the optical communication beam from the fiber core to propagate in the fiber grating as the low intensity portion of the optical communication beam, a coupling ratio of the second portion of the optical communication beam to the first portion of the optical communication beam depending on a strength of the diametric force and at least one period of at least one corresponding groove formed in the double-clad optical fiber due to the diametric force.

5. The method of claim 3, wherein the perturbation of the fiber core causes a speckle free, flat top type of output power profile of the optical communication beam as the optical communication beam exits the double-clad optical fiber.

6. The method of claim 3, wherein the optical transmitter comprises a single-mode light source.

7. The method of claim 1, further comprising coupling, by a long period grating, the second portion of the optical communication beam from the fiber core to propagate in the long period grating as a low intensity portion of the optical communication beam, the first portion of the optical communication beam propagating in the fiber core as a high intensity portion of the optical communication beam.

8. A method of free-space optical communication, the method comprising:
   guiding, by focusing optics, an optical communication beam emitted from an optical transmitter into a double-clad optical fiber, the optical communication beam carrying data, the double-clad optical fiber having first and second ends, the first end arranged to receive the optical communication beam, the double-clad optical fiber comprising:
      a fiber core having a first numerical aperture, the fiber core configured to propagate a first portion of the optical communication beam from the first end of the double-clad optical fiber to the second end of the double-clad optical fiber;
      a first cladding arranged concentrically around the fiber core, the first cladding having a second numerical aperture equal to or greater than the first numerical aperture, the first cladding configured to propagate a second portion of the optical communication beam from the first end of the double-clad optical fiber to the second end of the double-clad optical fiber; and
      a second cladding arranged concentrically around the first cladding; and
   directing, by collimating optics, the optical communication beam from the second end of the double-clad optical fiber toward an optical receiver of a communication terminal, the second portion of the optical communication beam arranged concentrically around the first portion of the optical communication beam, the first portion of the optical communication beam having a higher intensity than the second portion of the optical communication beam,
   wherein a coupling ratio of the second portion of the optical communication beam to the first portion of the optical communication beam is such that the second portion of the optical communication beam has a lower intensity than the first portion of the optical communication beam at a threshold distance from the collimating optics.

9. A method of free-space optical communication, the method comprising:
   guiding, by focusing optics, an optical communication beam emitted from an optical transmitter into a double-clad optical fiber, the optical communication beam carrying data, the double-clad optical fiber having first and second ends, the first end arranged to receive the optical communication beam, the double-clad optical fiber comprising:
      a fiber core having a first numerical aperture, the fiber core configured to propagate a first portion of the optical communication beam from the first end of the double-clad optical fiber to the second end of the double-clad optical fiber;
      a first cladding arranged concentrically around the fiber core, the first cladding having a second numerical aperture equal to or greater than the first numerical aperture, the first cladding configured to propagate a second portion of the optical communication beam from the first end of the double-clad optical fiber to the second end of the double-clad optical fiber; and
      a second cladding arranged concentrically around the first cladding;
   directing, by collimating optics, the optical communication beam from the second end of the double-clad optical fiber toward an optical receiver of a communication terminal, the second portion of the optical communication beam arranged concentrically around the first portion of the optical communication beam, the first portion of the optical communication beam having a higher intensity than the second portion of the optical communication beam;
   receiving, at positioning hardware, a position error from the communication terminal, the position error indicative of a misalignment between the collimating optics and the optical receiver of the communication terminal; and
   adjusting, by the positioning hardware, an alignment of the collimating optics with the optical receiver of the communication terminal based on the position error.

10. The method of claim 1, wherein the first portion of the optical communication beam has a narrower field of view and a higher optical signal-to-noise ratio than the second portion of the collimated optical communication beam.

11. The method of claim 1, wherein the collimating optics comprise at least one of a lens, a shaped fiber tip at the first end of the double-clad optical fiber, or a graded index fiber.

12. The method of claim 1, wherein the optical transmitter comprises a laser diode, a light emitting diode, a fiber laser, or a solid state laser.

13. The method of claim 1, wherein the optical transmitter modulates the optical communication beam to encode the data in the optical communication beam.

14. The method of claim 1, wherein the fiber core comprises a single mode core or a multimode core.

15. A system for free-space optical communication, the system comprising:
   an optical transmitter configured to emit an optical communication beam;
   a double-clad optical fiber having first and second ends, the double-clad optical fiber comprising:
      a fiber core having a first numerical aperture;
      a first cladding arranged concentrically around the fiber core, the first cladding having a second numerical aperture equal to or greater than the first numerical aperture; and
      a second cladding arranged concentrically around the first cladding;
   focusing optics disposed between the optical transmitter and the double-clad optical fiber, the focusing optics configured to guide the optical communication beam emitted from the optical transmitter into the first end of the double-clad optical fiber, the fiber core configured to propagate a high intensity portion of the optical communication beam from the first end of the double-clad optical fiber to the second end of the double-clad optical fiber, the first cladding configured to propagate a low intensity portion of the optical communication beam from the first end of the double-clad optical fiber to the second end of the double-clad optical fiber; and
   collimating optics configured to direct the optical communication beam from the second end of the double-clad optical fiber toward an optical receiver of a communication terminal, the collimated optical communication beam having a central portion comprising the high intensity portion of the optical communication beam and an outer portion concentric about the central portion, the outer portion comprising the low intensity portion of the optical communication beam,
   wherein the focusing optics are configured to:
      direct the first portion of the optical communication beam from the optical transmitter into the fiber core of the double-clad optical fiber; and direct the second portion of the optical communication beam from the optical transmitter into the first cladding of the double-clad optical fiber.

16. The system of claim 15, wherein the optical transmitter comprises a multi-mode light source.

17. A system for free-space optical communication, the system comprising:
an optical transmitter configured to emit an optical communication beam;
a double-clad optical fiber having first and second ends, the double-clad optical fiber comprising:
a fiber core having a first numerical aperture;
a first cladding arranged concentrically around the fiber core, the first cladding having a second numerical aperture equal to or greater than the first numerical aperture; and
a second cladding arranged concentrically around the first cladding;
focusing optics disposed between the optical transmitter and the double-clad optical fiber, the focusing optics configured to guide the optical communication beam emitted from the optical transmitter into the first end of the double-clad optical fiber, the fiber core configured to propagate a high intensity portion of the optical communication beam from the first end of the double-clad optical fiber to the second end of the double-clad optical fiber, the first cladding configured to propagate a low intensity portion of the optical communication beam from the first end of the double-clad optical fiber to the second end of the double-clad optical fiber; and
collimating optics configured to direct the optical communication beam from the second end of the double-clad optical fiber toward an optical receiver of a communication terminal, the collimated optical communication beam having a central portion comprising the high intensity portion of the optical communication beam and an outer portion concentric about the central portion, the outer portion comprising the low intensity portion of the optical communication beam,
wherein the fiber core comprises a perturbator configured to couple a second portion of the optical communication beam from the fiber core to propagate in the first a fiber grating as the low intensity portion of the optical communication beam, a first portion of the optical communication beam propagating in the fiber core as the high intensity portion of the optical communication beam.

18. The system of claim 17, wherein the perturbator is configured to exert a diametric force on the double-clad optical fiber to cause a microbending loss of the fiber core, resulting in the coupling of the second portion of the optical communication beam from the fiber core to propagate in the fiber grating as the low intensity portion of the optical communication beam, a coupling ratio of the second portion of the optical communication beam to the first portion of the optical communication beam depending on a strength of the diametric force and at least one period of at least one corresponding groove formed in the double-clad optical fiber due to the diametric force.

19. The system of claim 17, wherein the perturbator is configured to cause a speckle free, flat top type of output power profile of the optical communication beam as the optical communication beam exits the double-clad optical fiber.

20. The system of claim 17, wherein the optical transmitter comprises a single-mode light source.

21. The system of claim 17, wherein the perturbator comprises a long period grating configured to couple the second portion of the optical communication beam from the fiber core to propagate in the fiber grating.

22. A system for free-space optical communication, the system comprising:
an optical transmitter configured to emit an optical communication beam;
a double-clad optical fiber having first and second ends, the double-clad optical fiber comprising:
a fiber core having a first numerical aperture;
a first cladding arranged concentrically around the fiber core, the first cladding having a second numerical aperture equal to or greater than the first numerical aperture; and
a second cladding arranged concentrically around the first cladding;
focusing optics disposed between the optical transmitter and the double-clad optical fiber, the focusing optics configured to guide the optical communication beam emitted from the optical transmitter into the first end of the double-clad optical fiber, the fiber core configured to propagate a high intensity portion of the optical communication beam from the first end of the double-clad optical fiber to the second end of the double-clad optical fiber, the first cladding configured to propagate a low intensity portion of the optical communication beam from the first end of the double-clad optical fiber to the second end of the double-clad optical fiber; and
collimating optics configured to direct the optical communication beam from the second end of the double-clad optical fiber toward an optical receiver of a communication terminal, the collimated optical communication beam having a central portion comprising the high intensity portion of the optical communication beam and an outer portion concentric about the central portion, the outer portion comprising the low intensity portion of the optical communication beam,
wherein a coupling ratio of the second portion of the optical communication beam to the high intensity portion of the optical communication beam is such that the second portion of the optical communication beam has a lower intensity than the low intensity portion of the optical communication beam at a threshold distance from the collimating optics.

23. A system for free-space optical communication, the system comprising:
an optical transmitter configured to emit an optical communication beam;
a double-clad optical fiber having first and second ends, the double-clad optical fiber comprising:
a fiber core having a first numerical aperture;
a first cladding arranged concentrically around the fiber core, the first cladding having a second numerical aperture equal to or greater than the first numerical aperture; and
a second cladding arranged concentrically around the first cladding;
focusing optics disposed between the optical transmitter and the double-clad optical fiber, the focusing optics configured to guide the optical communication beam emitted from the optical transmitter into the first end of the double-clad optical fiber, the fiber core configured to propagate a high intensity portion of the optical communication beam from the first end of the double-clad optical fiber to the second end of the double-clad optical fiber, the first cladding configured to propagate a low intensity portion of the optical communication beam from the first end of the double-clad optical fiber to the second end of the double-clad optical fiber;

collimating optics configured to direct the optical communication beam from the second end of the double-clad optical fiber toward an optical receiver of a communication terminal, the collimated optical communication beam having a central portion comprising the high intensity portion of the optical communication beam and an outer portion concentric about the central portion, the outer portion comprising the low intensity portion of the optical communication beam; and positioning hardware configured to:
    receive a position error from the communication terminal, the position error indicative of a misalignment between the collimating optics and the optical receiver of the communication terminal; and
    adjust an alignment of the collimating optics with the optical receiver of the communication terminal based on the position error.

24. The system of claim 15, wherein the first portion of the optical communication beam has a narrower field of view and a higher optical signal-to-noise ratio than the second portion of the collimated optical communication beam.

25. The system of claim 15, wherein the collimating optics comprise at least one of a lens, a shaped fiber tip at the first end of the double-clad optical fiber, or a graded index fiber.

26. The system of claim 15, wherein the optical transmitter comprises a laser diode, a light emitting diode, a fiber laser, or a solid state laser.

27. The system of claim 15, wherein the fiber core comprises a single mode core or a multimode core.

\* \* \* \* \*

UNITED STATES PATENT AND TRADEMARK OFFICE
CERTIFICATE OF CORRECTION

PATENT NO.         : 9,755,739 B1
APPLICATION NO.    : 15/171348
DATED              : September 5, 2017
INVENTOR(S)        : Chiachi Wang and Michael Sholl It is certified that error appears in the above-identified patent and that said Letters Patent is hereby corrected as shown below:

Page 1 of 1

In the Claims

Claim 15, Column 24, Line 65:
Now reads "first portion"; should read -- central portion --

Claim 15, Column 25, Line 1:
Now reads "second portion"; should read -- outer portion --

Claim 22, Column 26, Line 39:
Now reads "the second portion"; should read -- a portion --

Claim 22, Column 26, Line 42:
Now reads "second portion"; should read -- portion --

Claim 24, Column 28, Line 4:
Now reads "first portion"; should read -- central portion --

Claim 24, Column 28, Line 7:
Now reads "second portion"; should read -- outer portion --

Signed and Sealed this
Eleventh Day of February, 2020

Andrei Iancu
*Director of the United States Patent and Trademark Office*